United States Patent
Pang et al.

(10) Patent No.: US 8,458,302 B2
(45) Date of Patent: Jun. 4, 2013

(54) AUTO-CONFIGURATION OF NETWORK PARAMETERS FOR MULTIMEDIA TRAFFIC USING SESSION DESCRIPTION PROTOCOL

(75) Inventors: Tak Ming Pang, Fremont, CA (US);
Hari Rangarajan, San Jose, CA (US);
Jianxia Ning, Riverside, CA (US);
Shobhit Sonakiya, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 208 days.

(21) Appl. No.: 12/973,168

(22) Filed: Dec. 20, 2010

(65) Prior Publication Data
US 2012/0158948 A1  Jun. 21, 2012

(51) Int. Cl.
*G06F 15/16* (2006.01)
(52) U.S. Cl.
USPC ........... 709/220; 709/225; 709/228; 370/230; 370/235

(58) Field of Classification Search
USPC ... 709/220, 225, 228; 370/235, 230; 455/411, 455/450
See application file for complete search history.

(56) References Cited

U.S. PATENT DOCUMENTS

| | | | |
|---|---|---|---|
| 8,249,236 B2* | 8/2012 | Das et al. | 379/202.01 |
| 8,305,896 B2* | 11/2012 | Wood et al. | 370/235 |
| 2004/0053601 A1* | 3/2004 | Frank et al. | 455/411 |
| 2009/0109849 A1* | 4/2009 | Wood et al. | 370/235 |
| 2010/0034195 A1* | 2/2010 | Das et al. | 370/352 |
| 2011/0276705 A1* | 11/2011 | Stokking et al. | 709/228 |

* cited by examiner

*Primary Examiner* — Khanh Dinh
(74) *Attorney, Agent, or Firm* — Tucker Ellis LLP

(57) ABSTRACT

In an example embodiment, a wireless distribution system obtains data for advertised data flows, such as multimedia traffic flows, by snooping attribute details of session description protocol (SDP) announcements. The wireless distribution system can use the data for functions such as admissions control, load balancing, and/or multicast to unicast conversion decisions.

21 Claims, 4 Drawing Sheets

AUTO-CONFIGURATION OF NETWORK PARAMETERS FOR MULTIMEDIA TRAFFIC USING SESSION DESCRIPTION PROTOCOL

TECHNICAL FIELD

The present disclosure relates generally to wireless networking.

BACKGROUND

Data flows, such as multimedia traffic flows, utilize a certain amount of bandwidth to meet Quality of Service (QoS) parameters. In wireless networking architectures, bandwidth can be limited. When a client requests a flow, the wireless networking architecture determines whether it can support the flow before admitting the request.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
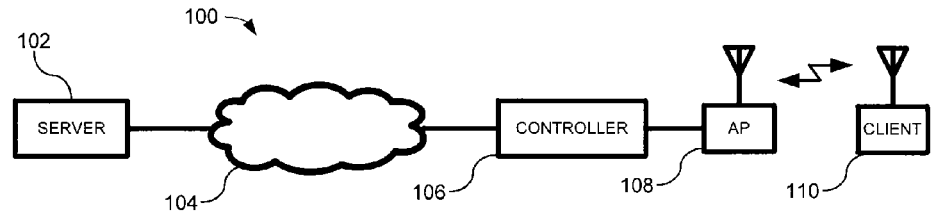
FIG. 1 is a block diagram illustrating a network upon which an example embodiment may be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a first interface configured to communicate with a distribution network, a second interface configured to communicate with a client, and processing logic coupled with the first interface and the second interface. The processing logic obtains data representative of a bandwidth for a session, which may be multicast and/or unicast, from an advertisement received via the first interface. The processing logic receives a request for a client for the session via the second interface. The processing logic determines whether sufficient bandwidth is available for the session based on the data representative of the bandwidth, and the processing logic admits the request from the client for the session responsive to determining sufficient bandwidth is available for the session based on the data representative of the bandwidth.

In accordance with an example embodiment, there is disclosed herein method that comprises receiving data representative of a bandwidth for a session from a session description protocol advertisement received from a first interface. The method further comprises receiving a request from a client for the session via a second interlace, wherein the second interface comprises a wireless link and determining whether sufficient bandwidth is available for the session based on the data representative of the bandwidth. The request for the session is granted responsive to determining sufficient bandwidth is available for the multicast based on the data representative of the bandwidth.

In accordance with an example embodiment there is disclosed herein logic encoded in at least one tangible media and when executed by a processor operable to obtain data representative of a bandwidth for a session from an advertisement received via a first interface. The logic is further operable to receive a request from a client for the session via a second interface, wherein the second interface comprises a wireless link, determine whether sufficient bandwidth is available for the session based on the data representative of the bandwidth, and admit the request from the client for the session responsive to determining sufficient bandwidth is available for the session based on the data representative of the bandwidth.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment described herein, a server, such as a multimedia server, uses session description protocol (SDP RFC4566, July 2006) to send out announcements that are broadcast to clients in a network. A node in the distribution system (DS), for example an access point or a controller coupled with at least one access point, snoops the announcement packets and maintains a database of advertised sessions. A session can be broadcast video, broadcast audio, broadcast audio and visual, an application, and/or any type of data exchanged between the server and a client. For example, a session may suitably comprise a multicast stream, a unicast stream, or a combination of multicast and unicast streams. In an example embodiment, the database contains information about the session, including but not limited to, bandwidth recommended by the source, media type, media attributes, etc.

For example when a client subscribes to a session by joining a multicast group, an admission control algorithm can use the information obtained about the bandwidth of the session to determine whether the client can be admitted. If the client cannot be admitted, for example if the access point has insufficient bandwidth, the client can be directed to roam to a neighboring access point (AP) with sufficient capacity. In particular embodiments, load balancing is employed for client admissions.

In an example embodiment, a client may obtain data from the SDP announcement to determine the bandwidth for a flow. The client can send a request with traffic specification (TSPEC) data to reserve bandwidth for a session. The controller (or AP) can verify the TSPEC from previously stored data for the flow. If the TSPEC is incorrect, the controller can deny the request, or in particular embodiments, the controller may limit the reserved bandwidth to the stored amount.

In an example embodiment, a controller determines from data in a SDP media type field (for example Video, Audio, application, etc.) whether specific operations are to be performed on a flow. For example, the controller may determine whether a multicast flow is to be converted to a unicast flow (which may be referred to as "MC2UC") before transmitting on the wireless network.

FIG. 1 is a block diagram illustrating a network 100 upon which an example embodiment may be implemented. In the illustrated example, network 100 comprises a server 102 that provides a multicast session, such as a multimedia session, or a video, audio, audiovisual, application, and/or data stream. Server 102 is coupled to a network 104, which may suitably comprise wired and/or wireless segments that couples server 102 with controller 106. Controller 106 provides the functionality described herein, and further comprises processing logic, described in more detail herein infra for providing the functionality described herein. Controller 106 is coupled with access point (AP) 108.

In an example embodiment, controller 106 is located remotely from AP 108. In another example embodiment, as illustrated by network 200 in FIG. 2, controller 106 is coupled with a plurality of APs 108. In the exampled illustrated in FIG. 2, controller 106 is coupled with at least AP1 108a and APn 108b APs, where n is an integer greater than one. Referring again to FIG. 1, in another example embodiment, controller 106 may be co-located, e.g. is instantiated in AP 108.

AP (or APs) 108 provides service to one or more wireless clients 110. Although only one server, network, controller, AP, and client is illustrated in FIGS. 1, and one server, network, controller, and client in FIG. 2, those skilled in the art should readily appreciate that the number of servers, networks, controllers, APs, and clients i is used in the illustrated example were selected merely for ease of illustration as the principles described herein are suitably adaptable to networks having any physically realizable number of servers, networks, controllers, APs, and clients.

In an example embodiment, server 102 sends advertisements on network 104 advertising sessions (multicast and/or unicast) available from server 102. In particular embodiments, the advertisements are SDP compatible. The advertisements contain data representative of a bandwidth for the session. Controller 108, coupled with network 104 can receive the advertisements and store bandwidth data associated with the session.

In an example embodiment, the advertisements may include additional data such as media type, e.g., audio, visual, audiovisual, application, streaming data, etc. This can allow controller 108 to determine the media type for the multicast session.

In particular embodiments, the advertisements may include data indicating whether any special features or processes for the multicast session such as aggregation, fragmentation, encryption, whether stream may be sent unencrypted, transcoding, conversions such as multicast to unicast conversion, etc. Controller 106 may perform any suitable process for the special feature.

When controller 106 receives a request for a session from client 110 via AP 108, controller 108 can determine the bandwidth for the session. Controller 108 admits (or grants) the request responsive to determining that AP 108 has sufficient capacity based on the bandwidth data obtained form the advertisements.

If controller 106 determines that AP 108 does not have sufficient capacity, controller 106 may deny the request or direct client 110 to another AP. For example, referring to FIG. 2 with continued reference to FIG. 1, if the request from client 110 is received by AP1 108a and controller 106 determines that AP1 108a does not have sufficient capacity to handle the multicast session but APn 108b does, controller 106 may signal client 110 to roam to APn 108b. In particular embodiments, controller 106 may also perform load balancing and may direct client 110 to roam to another AP for load balancing. For example, assuming for this example that client 110 is associating with AP1 108a, if controller 106 determines AP1 108a is heavily loaded while APn 108b is lightly loaded, controller 106 may direct client 110 to roam to APn 108b.

In an example embodiment, the request from client 110 includes a bandwidth reservation, such as a Traffic Specification (TSpec). Controller 106 verifies the bandwidth in the request matches or is consistent with the bandwidth obtained from the advertisement for the session. If the bandwidth in the request does not match, or exceeds, the bandwidth indicated in the advertisements, controller 106 may take corrective action. For example, in one embodiment, controller 106 may deny the request. In another example embodiment, controller 106 may grant the request but limit the amount of bandwidth allocated to the session to the amount indicated in the advertisement.

In particular embodiments, the request from client 110 includes a session start time and duration. The session start time and duration can be used to validate the corresponding Tspec request parameters. They can also be used to throttle and shape other traffic such that during the session, a certain amount of bandwidth can be reserved for the session traffic. For example, during a video program time, data traffic can be shaped to a predefined configured percentage to allow more video traffic to go through.

In an example embodiment, data representative of a priority of the session traffic can be embedded in the session information attribute. This can enable the infrastructure network to prioritize the session traffic over other traffic. In particular embodiments, the IP address and UPD/TCP port number specified in the SDP session connection information and media description attributes can be used for the classification of traffic packets and to perform throttling or shaping. The bandwidth specified in the bandwidth attribute can be used to shape and limit the session traffic to within the declared profile.

In particular embodiments, a session may suitably comprise multiple streams. Each stream may have an associated priority, and the data representative of the priority of the session may further include data representative of a priority for each of the plurality of streams. Thus, different streams of session traffic can be prioritized over each other as well as non-session traffic.

Figure 2:
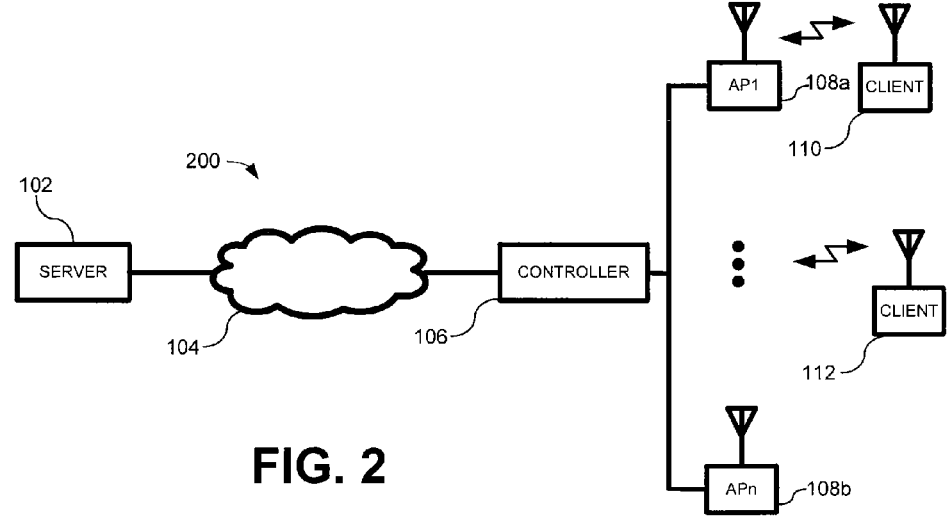
FIG. 2 is a block diagram of a network where a controller is coupled with multiple access points.

In an example embodiment, the multicast session is a video stream. Controller 106 may provide the stream at different resolutions depending upon the capabilities of client 110 and/or the bandwidth available for client 110. For example, FIG. 2 illustrates two clients 110, 112. Client 112 may be connected to any AP such as AP1 108a, APn 108b or any other AP coupled to controller 106. Clients 110, 112 are subscribing to the same video stream. Controller 106 receives the multicast stream from server 102 via network 104. Controller 106 converts the multicast video stream to a unicast video stream (or two streams in this example) and provides the video stream at a first resolution to client 110 and at a second resolution to client 112.

Figure 3:
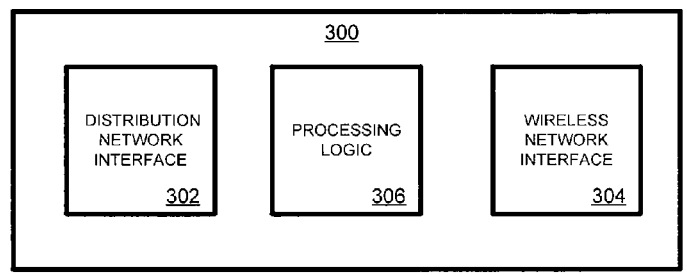
FIG. 3 is a block diagram of a controller upon which an example embodiment can be implemented.

FIG. 3 is a block diagram of a controller 300 upon which an example embodiment can be implemented. Controller 300 is suitable for implementing controller 106 described in FIGS. 1 and 2. Controller 300 has a first interface, distribution network interface 302 that is coupled with a distribution network that can receive a multicast session from a source such as a multi-media server. Controller 300 also has a second interface, wireless network interface, 304 that may be coupled with a wireless device, such as a wireless transceiver, an access point, or a plurality of access points for communicating with wireless clients. Processing logic 306 is coupled with first interface 302 and second interface 304 and performs the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, processing logic 306 obtains data representative of a bandwidth for a multicast session from an advertisement received via first interface 302. In particular embodiments, the advertisement for the multicast session is received via a SDP compatible packet. Processing logic 306 stores the bandwidth data for the session. The data may be stored in a database, lookup table, or any suitable structure.

Processing logic 306 receives a request from a client for the multicast session via second interface 304. Processing logic 306 can determine whether sufficient bandwidth is available for the multicast session based on the bandwidth data obtained from in the advertisement. For example, processing logic 306 may determine if the access point that received the request from the client has sufficient bandwidth available. If processing logic 306 determines that the access point has sufficient bandwidth based on the data obtained form the advertisement, processing logic will admit the session. Processing logic 306 may perform other tasks such as forwarding the request to the source, or other endpoint, of the multicast session via the first interface 302.

If processing logic 306 determines there is insufficient bandwidth available for the multicast session based on the data obtained from the advertisement, processing logic 306 may deny the request. In an example embodiment, processing logic 306 determines whether another neighboring access point that can communicate with the client has sufficient bandwidth for the multicast session and directs the client to roam to that access point. In yet another example embodiment, processing logic 306 performs load balancing and may direct a client to another access point for load balancing purposes.

In an example embodiment, the request from the client comprises data representative of a requested amount of bandwidth. Processing logic 306 verifies the requested amount of bandwidth with the data obtained from the advertisement. If the requested amount does not match, or exceeds, the data obtained from the advertisement, processing logic 306 may take corrective action. For example, processing logic 306 may deny the request. In another example embodiment, processing logic 306 may allow the request but limit the bandwidth allocated for the multicast session to the advertised amount.

In an example embodiment, the advertisement further comprises data representative of a specified feature for the multicast session. For example, the advertisement may indicate one or more of data compression, data decompression, transcoding, packet aggregation, packet fragmentation, data conversion, and/or multicast to unicast conversion should be performed. Processing logic 306 determines the specified feature from the advertisement, and performs the specified feature for the multicast session.

In an example embodiment, the advertisement further includes data indicating the type of session. For example, the session may be a member of a group consisting of audio, video, audiovisual (audio and video), application, and data. This enables processing logic 306 to determine the type of session from the advertisement.

In an example embodiment, the multicast session comprises a video stream. Processing logic can be configured to provide the video stream at different resolutions based on client capabilities and/or available bandwidth. For example, processing logic 306 may receive a first request for the video stream from a first client and a second request for the multicast stream from a second client via second interface 304. Processing logic 306 determines that the video stream should be provided at a first resolution to the first client and a second resolution to the second client. The video stream is received as a multicast stream via first interface 302. Processing logic 306 converts the stream to a first unicast stream having a first resolution addressed to the first client and to a second unicast stream having a second resolution addressed to the second client. Processing logic 306 forwards the first and second unicast streams to the first and second clients respectively via second interface 304.

Figure 4:
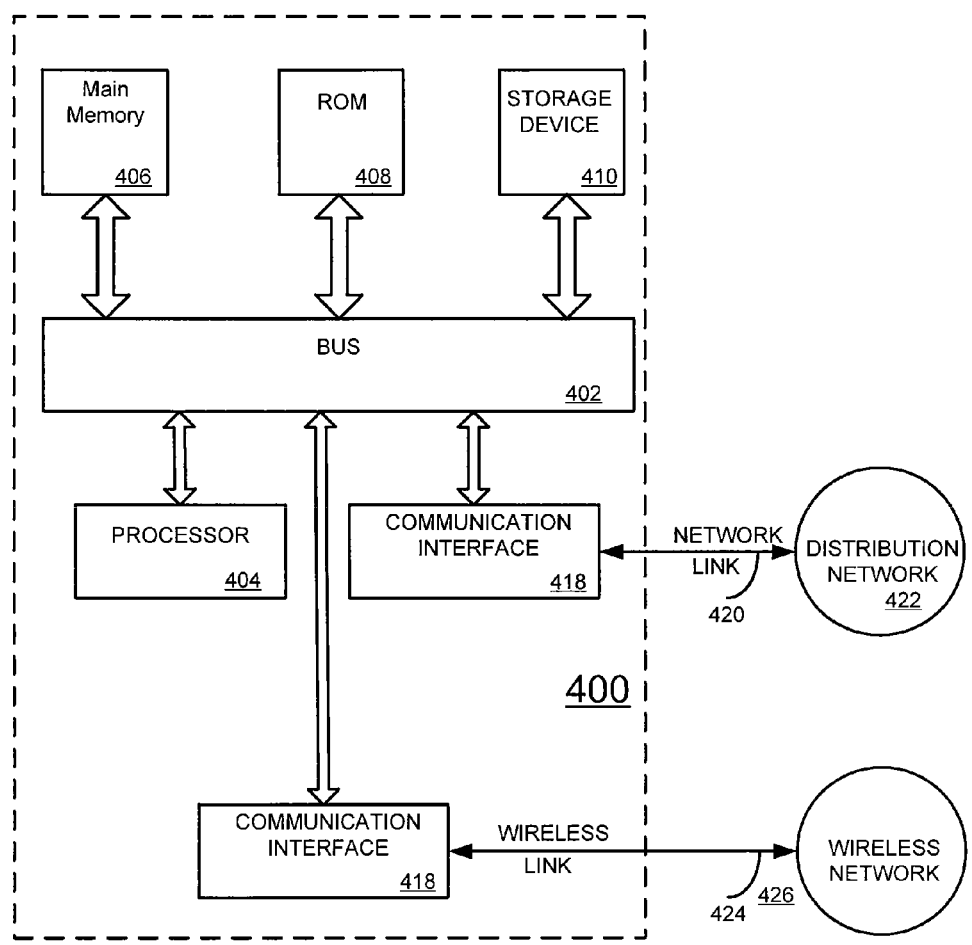
FIG. 4 is a block diagram of a computer system upon which an example embodiment may be implemented.

FIG. 4 is a block diagram of a computer system 400 upon which an example embodiment may be implemented. Computer system 400 may be employed to implement controller 300 described in FIG. 3.

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of the example embodiment is related to the use of computer system 400 for performing auto configuration of network parameters for multi-media traffic. According to an example embodiment, auto configuration of network parameters for multi-media traffic is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media, and volatile media. Non-volatile media include for example optical or magnetic disks, such as storage device 410. Volatile media include dynamic memory such as main memory 406. 4As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone via a modem. A modem local to computer system 400 can receive the data. Bus 402 carries the data to main memory 406 from which processor 404 retrieves and executes the instructions. The instructions received by main memory 406 may optionally be stored on storage device 410 either before or after execution by processor 404.

Computer system 400 also includes a plurality of communication interfaces 418 coupled to bus 402. One communication interface 418 provides a two-way data communication coupling computer system 400 with a network link 420 that is coupled with a distribution network 422. Another communication interface 418 provides two-way data communication coupling computer system 400 with wireless link 422 that is coupled with a wireless network 426. Wireless link 424 may be coupled with other devices, such as access points, that provide the communication with wireless devices on wireless network 426.

Figure 5:
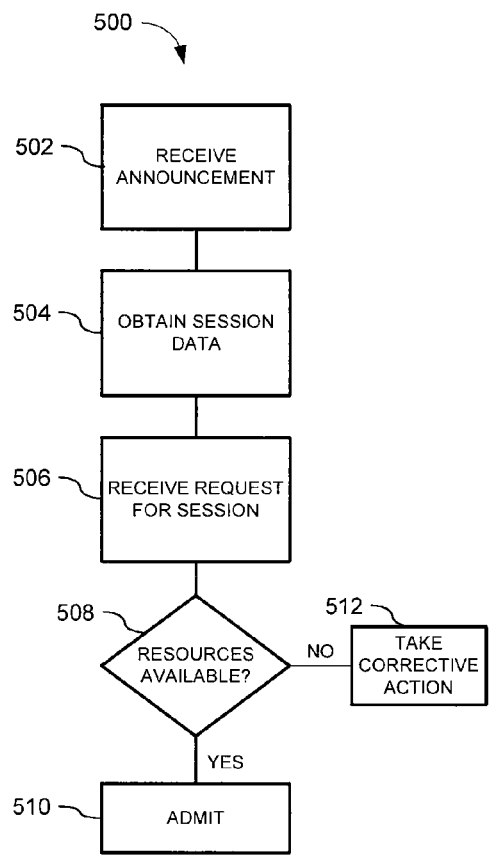
FIG. 5 is a block diagram of a methodology that employs session announcement data for admission control.
Figure 6:
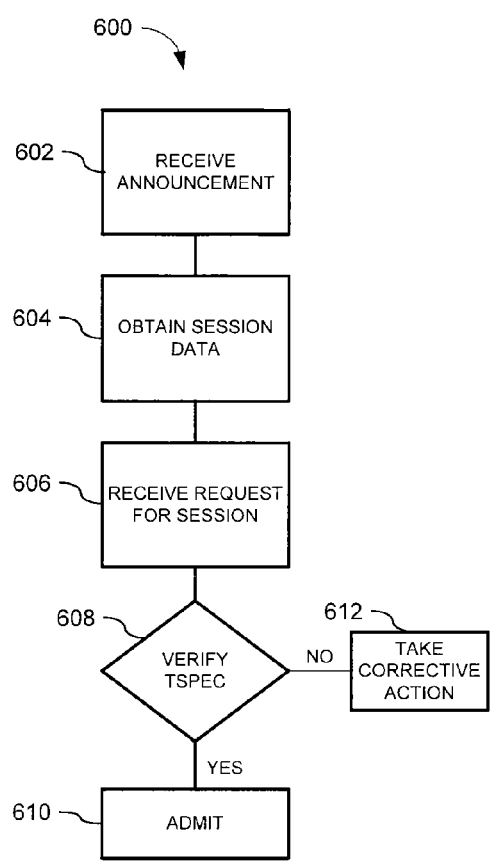
FIG. 6 is a block diagram of a methodology that employs session announcement data to verify bandwidth requested for a session by a client.
Figure 7:
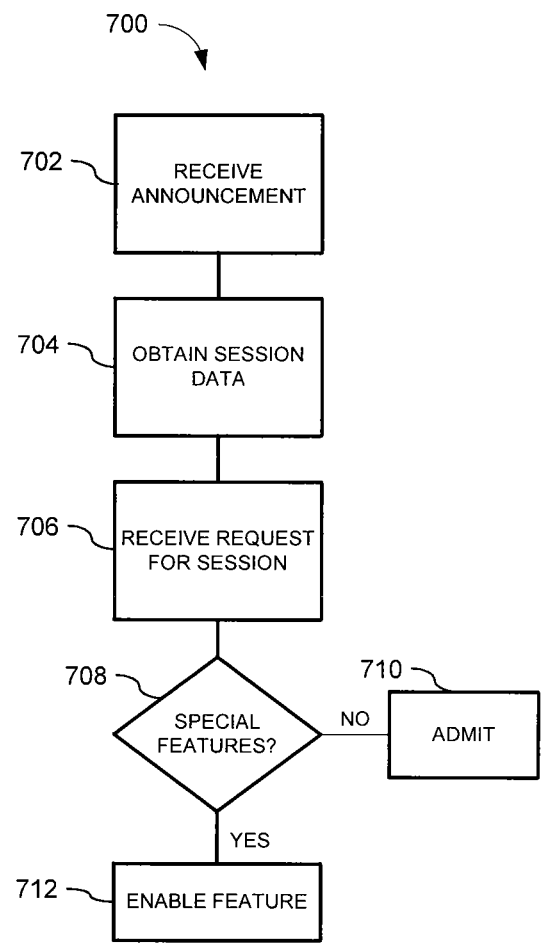
FIG. 7 is a block diagram of a methodology that employs session announcement data to determine whether a specific feature should be enabled.

In view of the foregoing structural and functional features described above, methodologies in accordance with example embodiments will be better appreciated with reference to FIGS. 5-7. While, for purposes of simplicity of explanation, the methodologies of FIGS. 5-7 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement the methodologies described herein. The methodologies described herein are suitable to be implemented in hardware, software which performs the described functionality when executed by a processor, or a combination thereof.

FIG. 5 is a block diagram of a methodology 500 that employs session announcement data for admission control. Methodology 500 may be implemented by controller 106 (FIG. 1 and/or 2), processing logic 306 (FIG. 3) and/or processor 404 (FIG. 4).

At 502, an announcement (or advertisement) is received from a source of a multicast session via a first interface coupled to a distribution network. The announcement comprises data representative of a bandwidth for the multicast session. In an example embodiment, the announcement is a session description protocol advertisement.

At 504, session data is obtained from the announcement. The session data may suitably comprise data representative of bandwidth for the multicast session. In particular embodiments, session data may include type of session data, e.g., video, audio, audiovisual, application, data, etc. and/or special features for the stream such as aggregation, fragmentation, encryption, compression, multicast to unicast conversion, transcoding, etc.

At 506, a request is received from a client for the multicast session via a second interface, wherein the second interface is coupled with a wireless link. The second interface may suitably comprise a wireless transceiver, or be coupled to one of more access points.

At 508, a determination is made whether sufficient bandwidth is available for the requested multicast session based on the data representative of the bandwidth obtained from the announcement. If sufficient bandwidth is available (YES), at 510 the request is granted.

If at 508, a determination is made that the sufficient resources are not available (NO), then corrective action is taken at 512. For example, in one embodiment, the request may be denied. In another example embodiment, the client requesting the session is directed to roam to a neighboring access point that can provide the service.

FIG. 6 is a block diagram of a methodology 600 that employs session announcement data to verify bandwidth requested for a session by a client. Methodology 600 may be implemented by controller 106 (FIG. 1 and/or 2), processing logic 306 (FIG. 3) and/or processor 404 (FIG. 4).

At 602, an announcement (or advertisement) is received from a source of a multicast session via a first interface coupled to a distribution network. The announcement comprises data representative of a bandwidth for the multicast session. In an example embodiment, the announcement is a session description protocol advertisement.

At 604, session data is obtained from the announcement. The session data may suitably comprise data representative of bandwidth for the multicast session. In particular embodiments, session data may include type of session data, e.g., video, audio, audiovisual, application, data, etc. and/or special features for the stream such as aggregation, fragmentation, encryption, compression, multicast to unicast conversion, transcoding, etc.

At 606, a request is received from a client for the multicast session via a second interface, wherein the second interface is coupled with a wireless link. The second interface may suitably comprise a wireless transceiver, or be coupled to one of more access points. In an example embodiment, the request includes data representative of a requested bandwidth. In particular embodiments, the request comprises a traffic specification (TSpec) having data representative of a requested amount of bandwidth.

At 608, the requested bandwidth from the client is verified with the bandwidth data obtained from the announcement. If the bandwidth requested by the client is verified (YES), at 610 the request for the multicast session is admitted (or granted).

If, at 608, the requested bandwidth from the client cannot be verified, e.g., doesn't match the bandwidth obtained from the announcement or exceeds the bandwidth obtained in the announcement by a predetermined amount (e.g., 10%, 20%, etc.), at 612 corrective action is taken. In an example embodiment, the request is denied. In another example embodiment, the request is granted; however, the bandwidth is limited to the amount obtained in the announcement.

FIG. 7 is a block diagram of a methodology 700 that employs session announcement data to determine whether a specific should feature be enabled. Methodology 700 may be implemented by controller 106 (FIG. 1 and/or 2), processing logic 306 (FIG. 3) and/or processor 404 (FIG. 4).

At 702, an announcement (or advertisement) is received from a source of a multicast session via a first interface coupled to a distribution network. The announcement comprises data representative of a feature (or special feature) of the multicast session. For example, the data may indicate whether some processing should be performed on the multicast session before providing the multicast session to the client.

At 704, session data is obtained from the announcement. The session data may suitably comprise data representative of bandwidth for the multicast session. In particular embodiments, session data may include type of session data, e.g., video, audio, audiovisual, application, data, etc. and/or special features for the stream such as aggregation, fragmentation, encryption, compression, multicast to unicast conversion, transcoding, etc.

At 706, a request is received from a client for the multicast session via a second interface, wherein the second interface is coupled with a wireless link. The second interlace may suitably comprise a wireless transceiver, or be coupled to one of more access points.

At 708, a determination is made whether there are any special features associated with the multicast session. If no special features are associated with the multicast session (NO), at 710 the multicast session is admitted without any special features.

If, however, at 708 a determination is made that there is a special feature associated with the multicast session (YES), at 712 the feature is enabled. For example a stream from the multicast session may be compressed, decompressed, encrypted, decrypted, transcoded, aggregated, fragmented, and/or a multicast stream may be converted to a unicast stream.

In an example embodiment, the multicast session comprises a stream, such as a video stream, that is provided to the client as a unicast stream. This enables the stream to have client specific attributes. For example, a multicast video stream may be provided to a client based on the amount of available bandwidth and/or the client's capabilities. If multiple clients are subscribing the multicast session, the video stream may be converted to the resolution appropriate for the receiving device. For example, the multicast stream may be converted to a first unicast stream to be sent to a first client and a second unicast stream to be sent to a second client. The first and second streams are sent to the first and second clients respectively via the second (wireless) interface.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a first interface configured to communicate with a distribution network;
a second interface configured to communicate wirelessly with a client;
processing logic coupled with the first interface and the second interface;
wherein the processing logic obtains data representative of a bandwidth for a session from an advertisement received via the first interface;
wherein the processing logic receives a request from a client for the session via the second interface;
wherein the processing logic determines whether sufficient bandwidth is available for the session based on the data representative of the bandwidth;
wherein the processing logic admits the request from the client for the session responsive to determining sufficient bandwidth is available for the session based on the data representative of the bandwidth;
wherein the processing logic prioritizes session traffic over non-session traffic having a lower priority; the processing logic shapes non-session traffic having a lower priority to allow more session traffic; and
wherein the session comprises a plurality of streams having an associated priority, the data representative of the priority of the session further comprises data representative of a priority for individual streams belonging to the plurality of streams, and the processing logic prioritizes session traffic based on the associated priority.

2. The apparatus of claim 1, wherein the advertisement is received via a Session Description Protocol compatible packet.

3. The apparatus of claim 1, wherein the request from the client further comprises data representative of a requested amount of bandwidth, a session start time and a duration;
wherein the processing logic verifies the requested amount of bandwidth with the data representative of a bandwidth received in the advertisement; and
wherein the processing logic verifies the session start time and duration.

4. The apparatus of claim 3, wherein the processing logic limits the bandwidth for the session to the bandwidth specified in the advertisement responsive to determining the bandwidth in the request exceeds the bandwidth specified in the advertisement.

5. The apparatus of claim 1, wherein the processing logic is further configured to receive a second request for the multicast stream from a second wireless device, the second request comprising data representative of a requested amount of bandwidth; and
wherein the processing logic denies the second request responsive to determining the data representative of a requested amount of bandwidth exceeds the data representative of a bandwidth received in the advertisement.

6. The apparatus of claim 1, wherein the advertisement further comprises data representative of a specified feature for the session; and
wherein the processing logic determines the specified feature from the advertisement.

7. The apparatus of claim 6, wherein the specified feature is a member of a group consisting of data compression, data decompression, transcoding, packet aggregation, packet fragmentation, data conversion, and multicast to unicast conversion; and
wherein the processing logic performs the specified feature for the session.

8. The apparatus of claim 1, wherein the advertisement further comprises data representative of a type of session; and
wherein the processing logic determines the type of session from the advertisement.

9. The apparatus of claim 8, wherein the type of session is selected from a group consisting of audio, video, audio and video, application, and data.

10. The apparatus of claim 1, wherein the session comprises a multicast video stream;
   wherein the processing logic receives a second request from a second client for the multicast session via the second interface;
   wherein the processing logic determines whether sufficient bandwidth is available for the second multicast session based on the data representative of the bandwidth;
   wherein the processing logic determines a resolution for the multicast stream for the first client and the second client;
   wherein the processing logic admits the second request from the client for the second multicast session responsive to determining sufficient bandwidth is available for the second multicast session based on the data representative of the bandwidth;
   wherein the processing logic converts the video stream to a first unicast stream for the first client having a first resolution;
   wherein the processing logic converts the video stream to a second unicast stream for the second client having a second resolution;
   wherein the processing logic forwards the first and second unicast streams to the first and second clients respectively via the second interface.

11. A method, comprising:
   receiving data representative of a bandwidth for a multicast session from a session description protocol advertisement received from a first interface;
   receiving a request from a client for the multicast session via a second interface, wherein the second interface comprises a wireless link;
   determining whether sufficient bandwidth is available for the multicast session based on the data representative of the bandwidth;
   granting the request for the multicast session responsive to determining sufficient bandwidth is available for the multicast session based on the data representative of the bandwidth;
   receiving a second request from a second client for the multicast session via the second interface;
   determining a resolution for providing the multicast stream to the first client and the second client;
   converting the video stream to a first unicast stream for the first client having a first resolution;
   converting the video stream to a second unicast stream for the second client having a second resolution;
   sending the first unicast stream to the first client via the second interface; and
   sending the second unicast stream to the second client via the second interface.

12. The method according to claim 11, wherein the request further comprises a traffic specification (TSpec) having data representative of a requested amount of bandwidth; and
   verifying the requested amount of bandwidth with the data representative of a bandwidth received in the advertisement.

13. The method of claim 11, further comprising limiting the bandwidth for the multicast session to the bandwidth specified in the advertisement responsive to determining the bandwidth in the request does not match the bandwidth specified in the advertisement.

14. The method of claim 12, further comprising:
   receiving a second request for the multicast stream from a second wireless device, the second request comprising a TSpec having data representative of a requested amount of bandwidth; and
   denying the second request responsive to determining the data representative of a requested amount of bandwidth in the TSpec does not match the data representative of a bandwidth received in the advertisement.

15. The method of claim 11, wherein the session description protocol advertisement further comprises data representative of a specified process to be performed for the multicast session, the method further comprises performing the specified process.

16. The method of claim 11, wherein the session description protocol advertisement further comprises data representative of a type of data stream associated with multicast session.

17. Logic encoded in at least one tangible, non-transitory, computer readable media for execution by a processor, and when executed by a processor operable to:
   obtain data representative of a bandwidth for a multicast session from an advertisement received via a first interface;
   receive a request from a client for the multicast session via a second interface, wherein the second interface comprises a wireless link;
   determine whether sufficient bandwidth is available for the multicast session based on the data representative of the bandwidth;
   admit the request from the client for the multicast session responsive to determining sufficient bandwidth is available for the multicast session based on the data representative of the bandwidth;
   receive a second request from a second client for the multicast session via the second interface;
   determine a resolution for the multicast stream for the first client and the second client;
   provide a first unicast stream having a first resolution from the video stream to the first client via the second interface; and
   provide a second unicast stream having a second resolution from the video stream to the second client via the second interface.

18. The logic of claim 17, wherein the request from the client further comprises data representative of a requested amount of bandwidth; and
   the logic is further operable to verify the requested amount of bandwidth with the data representative of a bandwidth received in the advertisement.

19. An apparatus, comprising:
   a first interface configured to communicate with a distribution network;
   a second interface configured to communicate wirelessly with a client;
   processing logic coupled with the first interface and the second interface;
   wherein the processing logic obtains data representative of a bandwidth for a session from an advertisement received via the first interface;
   wherein the processing logic receives a request from a client for the session via the second interface;
   wherein the processing logic determines whether sufficient bandwidth is available for the session based on the data representative of the bandwidth;
   wherein the processing logic admits the request from the client for the session responsive to determining sufficient bandwidth is available for the session based on the data representative of the bandwidth;

wherein the session comprises a multicast video stream;

wherein the processing logic receives a second request from a second client for the multicast session via the second interface;

wherein the processing logic determines whether sufficient bandwidth is available for the second multicast session based on the data representative of the bandwidth;

wherein the processing logic determines a resolution for the multicast stream for the first client and the second client;

wherein the processing logic admits the second request from the client for the second multicast session responsive to determining sufficient bandwidth is available for the second multicast session based on the data representative of the bandwidth;

wherein the processing logic converts the video stream to a first unicast stream for the first client having a first resolution;

wherein the processing logic converts the video stream to a second unicast stream for the second client having a second resolution;

wherein the processing logic forwards the first and second unicast streams to the first and second clients respectively via the second interface.

20. A method, comprising:

obtaining data representative of a bandwidth for a session from an advertisement received via a first interface;

receiving a request from a client for the session via a second interface;

determining whether sufficient bandwidth is available for the session based on the data representative of the bandwidth;

admitting the request from the client for the session responsive to determining sufficient bandwidth is available for the session based on the data representative of the bandwidth;

prioritizing, by processing logic, session traffic over non-session traffic having a lower priority; the processing logic shapes non-session traffic having a lower priority to allow more session traffic; and wherein the session comprises a plurality of streams having an associated priority, the data representative of the priority of the session further comprises data representative of a priority for individual streams belonging to the plurality of streams, and the processing logic prioritizes session traffic based on the associated priority.

21. Logic encoded in at least one tangible, non-transitory, computer readable media for execution by a processor, and when executed by a processor operable to:

obtain data representative of a bandwidth for a session from an advertisement received via a first interface;

receive a request from a client for the session via a second interface;

determine whether sufficient bandwidth is available for the session based on the data representative of the bandwidth;

admit the request from the client for the session responsive to determining sufficient bandwidth is available for the session based on the data representative of the bandwidth;

prioritize session traffic over non-session traffic having a lower priority; the non-session traffic having a lower priority is shaped to allow more session traffic; and wherein the session comprises a plurality of streams having an associated priority, the data representative of the priority of the session further comprises data representative of a priority for individual streams belonging to the plurality of streams, and the processing logic prioritizes session traffic based on the associated priority.

* * * * *